Sept. 11, 1923.

T. F. HANLEY 1,467,933

REENFORCED PIPE OR FITTING

Filed Feb. 16, 1920

INVENTOR.
Thomas F. Hanley.
BY Victor J. Evans
ATTORNEYS.

Patented Sept. 11, 1923.

1,467,933

UNITED STATES PATENT OFFICE.

THOMAS F. HANLEY, OF CHICAGO, ILLINOIS.

REENFORCED PIPE OR FITTING.

Application filed February 16, 1920. Serial No. 359,093.

*To all whom it may concern:*

Be it known that I, THOMAS F. HANLEY, a citizen of the United States, residing at Chicago, in the county of Cook and State of Illinois, have invented new and useful Improvements in Reenforced Pipes or Fittings, of which the following is a specification.

This invention relates to an improved form of fitting or pipe and has for its primary object the construction of a fitting or pipe in such a manner that the same will be materially reenforced and the stress created by the adjusting tool distributed over an extended area of the pipe or fitting so as to prevent distortion of the same.

An object of the invention is to provide a fitting or pipe that will have an effective grip with the wrench, tongs, or other tools used upon the fitting or pipe thereby preventing the slipping of the tool which causes marring of the fitting or pipe and besides, quite often, injury to the workmen.

An object of the invention is the fact that the ribs may be of any size or shape thereby accomplishing an effective grip with the tools and besides space the tool from the surface of the pipe or fitting and thus prevent a restricted portion of the fitting or pipe from being subject to a marring action and restricted portions to excessive strains.

A feature of my invention is the novel manner of arranging and connecting the ribs and beads so that the pipe or fitting will be materially reenforced throughout.

Besides the above my invention is distinguished in the manner of connecting and associating the beads and ribs in a single element so that the same may be effectively forced on to a fitting or pipe and shrunk or spot welded.

With these and other objects in view the invention will be better understood from the following detailed description taken in connection with the accompanying drawing wherein—

Figure 1:
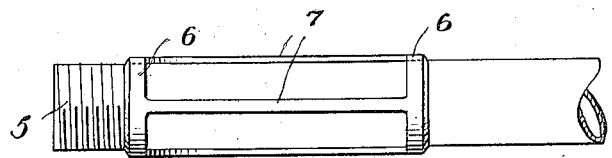
Fig. 1 illustrates a portion of a pipe constructed in accordance with my invention.

At the start I wish to call attention to the fact that there are various ways of constructing and arranging the ribs and beads and their connection with each other and, therefore, I wish to emphasize the fact that there are many other forms that my invention can assume other than illustrated in the drawing.

Referring to Fig. 1 I have shown a portion of a pipe provided adjacent its screw threads 5 with my re-inforcing device consisting of circumferential extending beads 6 connected by the ribs 7. At this point I wish to call attention to the fact that if found advantageous in practice the ribs 7 may be extended the entire length of the pipe so as to materially reinforce the same.

Figure 2:
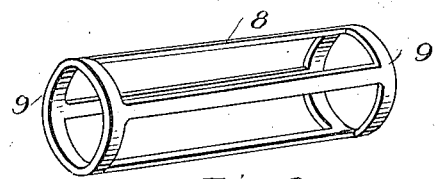
Fig. 2 is a perspective view showing the ribs and beads connected so as to be arranged in place.

In Fig. 2 I have shown ribs 8 connected to the beads 9 to form an independent element that will be shrunk on to the pipe or forced on to the pipe and then spot welded.

From this construction it will be apparent that the ends of the fitting are materially reenforced against splitting by the annular beads and that intermediate portions of the fitting are reenforced by the ribs. The ribs will also come in direct contact with the tool such as a pipe wrench or the like and will distribute the strain over the length of the fitting during the tightening of the latter and furthermore a firm and non-slipping grip of the wrench or tool is provided which prevents marring of the fitting during installation.

In concluding my description I wish to lay stress upon the fact that the ribs may be of any shape or of any length and connect the beads in any manner found advantageous and I do not wish to be limited to the number of beads used or the number of ribs.

Having thus described my invention what I claim is—

The combination with a length of pipe or fitting having a threaded portion, of a pair of spaced rings, a plurality of parallel ribs connecting said rings, said rings being spaced apart a distance greater than their diameters said rings and ribs mounted upon and secured to the pipe or fitting with one of the rings adjacent to the inner end of the threaded portion of the pipe or fitting.

In testimony whereof I affix my signature.

THOMAS F. HANLEY.